United States Patent
Anner et al.

[15] 3,679,716
[45] July 25, 1972

[54] NEW 3, 16α, 17β-TRIHYDROXY-Δ$^{1,3,5(10)}$-OESTRATRIENE

[72] Inventors: Georg Anner; Jaroslav Kalvoda, both of Basel, Switzerland

[73] Assignee: Ciba-Geigy Corporation, Ardsley, N.Y.

[22] Filed: Feb. 11, 1970

[21] Appl. No.: 10,647

[30]   Foreign Application Priority Data

Feb. 27, 1969   Switzerland ............................2963/69

[52] U.S. Cl. ...................260/397.5, 260/397.4, 260/239.55
[51] Int. Cl. .............................................................C07c 169/08
[58] Field of Search................................................260/397.5

[56]   References Cited

UNITED STATES PATENTS 3,557,161   1/1971   Dusza et al. ...........................260/397.5
3,558,776   1/1971   Campbell et al. ......................424/243

*Primary Examiner*—Elbert L. Roberts
*Attorney*—Harry Goldsmith, Joseph G. Kolodny and Mario A. Monaco

[57]   ABSTRACT

The compound of the formula

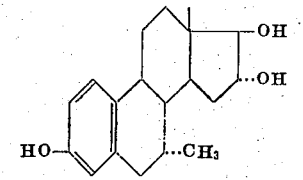

Use: Oestrogenic agent for inhibiting the gonadotropic function and ovulation.

1 Claim, No Drawings

NEW 3, 16α, 17α-TRIHYDROXY-Δ $^{1,3,5(10)}$ - OESTRATRIENE

SUMMARY OF THE INVENTION

The new 7α-methyl-3,16,17β-trihydroxy-Δ$^{1,3,5(10)}$-oestratriene processes valuable pharmacological properties. Thus it above all shows oestrogenic, antigonadotropic, ovulation-inhibiting and/or blastocyteimplantation-inhibiting effects.

The oestrogenic activity can for example be demonstrated in the known Allen-Doisy test on female rats using doses of 0.003 to 0.3 mg/kg s.c. and of 0.01 to 3 mg/kg p.o., and in the known Bülbring-Burn test, again on female rats, with doses of 0.0003 to 0.3 mg/kg s.c. and 0.003 to 1 mg/kg p.o. In the parabiosis test on rats, the antigonadotropic effect can furthermore be demonstrated using doses of 0.0003 to 0.03 mg/kg s.c. and 0.01 to 0.3 mg/kg p.o. The ovulation-inhibiting activity can be demonstrated on normal female rats, using doses of 0.0001 to 0.003 mg/kg s.c. and 0.003 to 0.1 mg/kg p.o. The blastocyteimplantation-inhibiting activity can be demonstrated on normal rats after copulation, using doses of 0.001 to 0.003 mg/kg s.c. and 0.01 to 0.03 mg/kg p.o. The new compound can thus be used as an oestrogenic agent for inhibiting the gonadotropic function and the ovulation, as well as generally for controlling the fertility.

The new compound can be obtained if a compound of formula

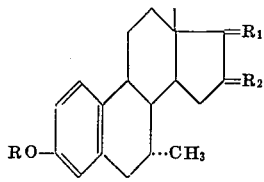

wherein RO represents a free, esterified or etherified hydroxyl group, $R_1$ represents an oxo group and $R_2$ represents an esterified hydroxyl group in the α-position together with A hydrogen atom, or $R_1$ represents a free or esterified hydroxyl group in the β-position together with a hydrogen atom and $R_2$ represents an oxo group, or $R_1$ represents an esterified hydroxyl group in the β-position and together with $R_2$ represents an epoxy group in the α,α-position, is reduced, the 16α, 17β-dihydroxy compound is isolated from the reaction mixture, and if esterified or etherified hydroxyl groups are present in the resulting compound, the former are split in a manner which is in itself known to give free hydroxyl groups.

The above-mentioned reduction takes place in a manner which is in itself known. Thus a 16α-acyloxy-17-oxo compound or a 16α, 17α-epoxy-17β-acyloxy compound can be reduced with a di-light metal hydride, preferably lithium aluminum hydride or sodium borohydride. This reduction can however also be effected catalytically, for example with hydrogen in the presence of a platinum catalyst. The 16-oxo-17β-hydroxy compound, the hydroxyl group of which can also be esterified, is preferably reduced with nascent hydrogen, such as is for example produced by sodium in an alcohol, or also catalytically in the presence of, for example, a platinum catalyst. Esterified or etherified hydroxyl groups which may be present are split in the usual manner to give the free hydroxy group.

An esterified hydroxyl group in the starting substances is preferably a hydroxyl group esterified with a lower aliphatic carboxylic acid, for example with acetic acid.

The desired compound is separated from the reaction mixture which may contain isomeric compounds in a manner which is in itself known, for example by fractional crystallization or chromatography.

The starting substances are known or can be obtained from known compounds in a manner which is in itself known. Thus the 16,17-epoxy-17-acyloxy compound can be obtained by converting the known 7α-methyl-oestrone into its 17-enol-acylate and reaction with a per-acid. The 16α-acyloxy-17-oxo compound can be obtained therefrom by reaction with, for example perchloric acid and the 16-oxo-17β-hydroxy compound can be obtained therefrom by rearrangement with a base, for example potassium carbonate.

The new compound can be used as a medicine in the form of pharmaceutical preparation which contain this compound together with pharmaceutical organic or inorganic, solid or liquid excipients which are suitable for enteral, for example oral, or parenteral administration. Suitable substances for forming these preparations are substances which do not react with the new compound such as for example water, gelatine, lactose, starch, magnesium stearate, talc, vegetable oils, benzyl alcohols, gum, polyalkylene glycols, cholesterol or other known medicinal excipients. The pharmaceutical preparations can for example be in the form of tablets, dragees or capsules or in a liquid form as solutions, suspensions or emulsions. They are optionally sterilized and/or contain auxiliary substances such as preservatives, stabilizers, wetting agents or emulsifiers, salts for regulating the osmotic pressure or buffers. They may also contain further therapeutically valuable substances.

The invention is described in more detail in the examples which follow.

EXAMPLE 1

3.0 g of 3,16α-diacetoxy-7α-methyl-17-oxo-Δ$^{1,2,5(10)}$oestratriene in 100 ml of absolute tetrahydrofuran are added dropwise at about 5°–10° C. to a suspension of 1 g of lithium aluminum hydride in 50 ml of absolute tetrahydrofuran, the solution is rinsed down with 100 ml of absolute tetrahydrofuran and the reaction mixture is boiled for 14 hours under a reflux condenser. At 5° C. 5 ml of ethyl acetate in 10 ml of tetrahydrofuran are first added dropwise, followed by 5 ml of water added dropwise, the mixture is briefly warmed to about 40° C. and filtered, and the residue well rinsed with chloroform. The filter residue is stirred for 1 hour with 300 ml of 2 N hydrochloric acid at room temperature, and is filtered off and rinsed with water. The residue is suspended in water and is extracted 4 times with 300 ml at a time of a chloroform-methanol mixture (4:1). The combined organic phases are dried with sodium sulphate and evaporated in a waterpump vacuum. 3,16α,17β-trihydroxy-7α-methyl-Δ $^{1,3,5(10)}$-oestratriene (7α-methyl-oestriol) is thus obtained, which after recrystallization from methylene chloride-methanol-ether melts at 235°–236° C. $[α]_D^{20°} = + 55° ± 1°$ ($c = 0.912$ in ethanol).

The starting material used in this example can for example be obtained as follows:

About 100 ml are distilled from a solution of 30 g of 7α-methyl-oestrone, 300 ml of isopropenyl acetate and 19.2 ml of a solution of 40 ml of isopropenyl acetate and 1.3 ml of concentrated sulphuric acid at normal pressure. After further addition of 300 ml of isopropenyl acetate and 19.2 ml of a solution of 40 ml of isopropenyl acetate and 1.3 ml of concentrated sulphuric acid about 400 ml are distilled off at normal pressure in the course of a further 3 hours, whereupon, after cooling to 5° C., a solution of 42 ml of pyridine in 300 ml of ether is added. After diluting with ice and water the dark mixture is twice extracted with an ether-methylene chloride mixture (4:1) and the organic constituents are washed with water, ice-cold dilute sulphuric acid, water, saturated sodium hydrogen carbonate solution and again with water until neutral. They are dried over sodium sulphate and evaporated to dryness under a waterpump vacuum. The resulting brown foam is chromatographed on a 50-fold quantity of silica gel. On elution with a toluene-ethyl acetate mixture (95:5) crude 3,17-diacetoxy-7α-methyl-Δ$^{1,3,5(10),16}$-oestratetraene is obtained, which after one recrystallization from ether/petroleum ether melts at 110°–111° C. $[α]_D^{20°} = +77° ± 2°$ (=0.639).

2.3 g of approximately 88 percent strength m-chloroperbenzoic acid are added at about 18° C. to a solution of 3.38 g of the resulting compound in 70 ml of methylene chloride and the mixture is stirred for 30 minutes at room temperature. The reaction solution is diluted with ether, washed with potassium iodide solution, sodium thiosulphate solution, water, saturated sodium hydrogen carbonate solution and again with water until neutral, the wash waters are extracted with ether and the combined organic extracts are dried over sodium sulphate. After evaporation and recrystallization of the residue from methylene chloride-ether-petroleum ether 3,17β-diacetoxy-7α-methyl-16α,17α-oxido-Δ$^{1,3,5(10)}$-oestratriene of melting point 156°–157° C. is obtained. [α]$^{20°}$ = +51°±2° (c=0.635).

3.22 g of this compound are dissolved in 32 ml of an acetic acid-perchloric acid solution obtained from 49 ml of 96 percent strength acetic acid and 1 ml of 70 percent strength perchloric acid, and the mixture is stirred for 10 minutes at room temperature. The reaction solution is mixed with ice and water, twice extracted with ether-methylene chloride, and the organic extracts are twice washed with water, dried over sodium sulphate and evaporated to dryness in a water-pump vacuum. The residue is acetylated overnight with 15 ml of pyridine and 15 ml of acetic anhydride. The mixture is then poured on to ice and water, allowed to stand at room temperature, twice extracted with ether, and the organic phase washed with dilute sulphuric acid, water, saturated sodium hydrogen carbonate solution and again with water. The extract is dried over sodium sulphate and evaporated under a waterpump vacuum. 3,16α-diacetoxy-7α-methyl-17-oxo-Δ$^{1,3,5(10)}$-oestratriene is thus obtained, which after recrystallization from ether-petroleum ether melts at 138°–139° C. [α]$_D^{20°}$ = +135°±2° (c=0.550).

EXAMPLE 2

A solution of 7.14 g of 3,17β-diacetoxy-7α-methyl-16α-17α-oxido-Δ$^{1,3,5(10)}$-oestratriene in 285 ml of tetrahydrofuran is added to a suspension of 2.85 g of lithium aluminum hydride in 285 ml of tetrahydrofuran at about 10°–15° C. After rinsing down with 140 ml of tetrahydrofuran, the reaction mixture is boiled for 2 hours under a reflux condenser, treated at about 10° C. firstly with 30 ml of ethyl acetate and then with 550 ml of 2N hydrochloric acid, and 1 liter of chloroform is added. The mixture is stirred for 10 minutes at room temperature, and the organic constituents are separated off, washed with water, dried over sodium sulphate and evaporated to dryness in a waterpump vacuum. The residue is adsorbed on a 50-fold amount of silica gel and the acid is eluted with a 7:3 mixture of toluene and ethyl acetate and then with ethyl acetate. Evaporation of the eluate obtained with ethyl acetate yields 3,16α,17β-trihydroxy-7α-methyl-Δ$^{1,3,5(10)}$-oestratriene, which after recrystallization from methylene chloride/methanol/ether melts at 235°–236°C. [α]$_D^{20°}$ = +55°±1° (c=0.912 in ethanol).

EXAMPLE 3

Six-hundred mg of 3,17α-dihydroxy-7α-methyl-16-oxo-Δ$^{1,3,5(10)}$-oestratriene are refluxed in 50 ml of isopropanol. In the course of 20 minutes, 2.0 g of sodium are added in portions. When all of the sodium has dissolved, the cooled solution is poured into a mixture of ice and water, and the batch is acidified with dilute hydrochloric acid. The substance which precipitates is filtered off and dissolved in methylene chloride+methanol, the solution dried over sodium sulfate and evaporated in a water-jet vacuum, then chromatographed over the 30-fold quantity of silica gel. Elution with a 30:70 mixture of toluene and ethyl acetate yields 365 mg of crude 7α-methyl estriol which after recrystallization from methylene chloride+methanol+235°–236° C.

The starting material used in this example can be prepared for example as follows:

4.0 g of solid 3,16α-diacetoxy-7α-methyl-17-oxo-Δ$^{1,3,5(10)}$-estratriene are added to a briefly boiled suspension of 5.0 g of potassium carbonate in 100 ml of methyl alcohol. The reaction solution is then refluxed for 45 minutes under nitrogen, then poured into a mixture of ice and water, acidified with dilute hydrochloric acid, and filtered. The filter cake is dried and dissolved in methylene chloride, and filtered through 50 g of alumina (activity stage II, neutral) to eliminate a polar contamination. 2.50 g of pure, non-crystallizing 3,17β-dihydroxy-7α-methyl-16-oxo-Δ$^{1,3,5(10)}$-oestratriene are obtained.

We claim:
1. The 7α-methyl-3,16α,17β-trihydroxy-Δ$^{1,3,5(10)}$-oestratriene of the formula

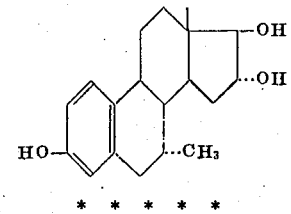

* * * * *